United States Patent [19]

Keller et al.

[11] 4,385,081
[45] May 24, 1983

[54] PROCESS OF COATING AN ELECTRIC COMPONENT WITH A SETTING ARTIFICIAL RESIN

[75] Inventors: Reinhard Keller, Nuremberg; Karl Treml, Iphofen Ortsteil Possenheim, both of Fed. Rep. of Germany

[73] Assignee: International Standard Electric Corporation, New York, N.Y.

[21] Appl. No.: 258,087

[22] Filed: Apr. 27, 1981

[51] Int. Cl.³ .............................................. B05D 5/12
[52] U.S. Cl. .................................... 427/80; 427/58; 427/79; 427/314; 427/318; 427/327; 427/385.5; 427/388.1; 427/388.2
[58] Field of Search ............... 427/79, 80, 58, 435, 427/318, 327, 314, 385.5, 388.1, 388.2, 185, 195; 361/433

[56] References Cited

U.S. PATENT DOCUMENTS

| | | | |
|---|---|---|---|
| 2,594,096 | 4/1952 | Trigg | 427/116 |
| 2,661,307 | 12/1953 | Foster | 427/116 |
| 3,479,200 | 11/1969 | Estabrooks | 427/195 |
| 3,801,348 | 4/1974 | Helm | 427/195 |
| 3,864,798 | 2/1975 | Utner | 427/185 |
| 3,930,070 | 12/1975 | Cronenberger et al. | 427/195 |
| 4,090,288 | 5/1978 | Thompson et al. | 361/433 |
| 4,179,725 | 12/1979 | Maguire | 361/433 |
| 4,224,656 | 9/1980 | DeMatos et al. | 361/433 |
| 4,288,468 | 9/1981 | Utner | 427/195 |

*Primary Examiner*—Norman Morgenstern
*Assistant Examiner*—Richard Bueker
*Attorney, Agent, or Firm*—John T. O'Halloran; Robert P. Seitter

[57] ABSTRACT

A process of coating an electric component with a setting artificial resin by dipping the component into the liquid resin-hardener compound and curing the deposited layer by the application of heat, comprising heating said component before dipping said component into said resin-hardener compound.

6 Claims, No Drawings

PROCESS OF COATING AN ELECTRIC COMPONENT WITH A SETTING ARTIFICIAL RESIN

FIELD OF THE INVENTION

The invention relates to a process of coating an electric component with a setting artificial resin by dipping the component into the liquid resin-hardener compound, and curing the deposited layer by way of heating.

One simple way of tightly enclosing electric components resides in depositing a layer of setting artificial resin onto the component, with this layer being solidified by way of curing.

For depositing the non-hardened artificial resin compound two different processes are used.

In the well known dipping process, the component to be coated is dipped into a liquid resin-hardener compound. Thereafter, the component, together with the layer of compound adhering thereto, is introduced into an oven in which the curing of the liquid resin-hardener compound is carried out. Since the curing of the deposited layer is effected from the outside towards the inside by the heat acting thereupon, steps must be taken, on one hand, for preventing the liquid artificial resin compound from dripping off the component prior to the curing. In particular, it is desirable to prevent the compound from dripping off the subsequently following parts of the terminal wires. On the other hand, it has been observed that the deposited layer, subsequently to the curing, contains pores or blisters. It has been established that these pores or blisters in the deposited artificial resin coating originate with the component itself. The component contains a large amount of air which expands when heated. In the course of slowly heating the component and owing to the effects of heat, the air within the component expands during the curing process and penetrates into the still soft or liquid artificial resin compound on the component. These pockets of air are retained as the resin compound is cured and are trapped in the final product. These air pockets may take the form of pores or blisters and result in a porous enveloping compound. In some cases, owing to the heating of the component, also other gases are produced by the component which likewise lead to the formation of pores or blisters in the enveloping compound. Such a more or less porous enveloping compound, however, does not provide a reliable protection for the component against the ambient atmosphere, since humidity from the outside can pass through the enveloping coating. It is known that the admission of humidity into the component has a disadvantageous effect upon the electrical properties of the component.

Another known process of manufacturing a protective envelope of artificial resin around a component calls for the application of a non-hardened resin compound which is subsequently cured. The resin compound in the form of fine powder is whirled up by a high pressure stream of air and is thus brought into a fluidic state. The heated component is then introduced into this whirled up artificial resin powder. The artificial resin particles are deposited onto the hot component and melt on the surface of the component thus forming a layer of artificial resin which is thereafter subjected to a complete curing.

As a rule, only relatively thin layers result from this process. In order to obtain a thicker coating it is necessary to apply several layers which can only be accomplished by serially repeating the procedure. In the course of this so-called whirl-sintering or fluidized-bed coating process, air is compulsorily included in the coating or enveloping layer. This occurs because air must be compulsorily fed to the fluidized bed during the application, under a considerable pressure. Especially in this process, the deposited layers tend to have many pores or blisters, so that a tight sealing against the ambient atmosphere is not insured. In this process, the components are heated up to a temperature ranging approximately between 120° and 130° C. and, upon having been heated, must be brought as quickly as possible into the whirled-up artificial resin powder. In this process the production involves a considerably greater investment than the previously described process of dipping a component into a liquid resin-hardener compound.

SUMMARY OF THE INVENTION

It is the object of the present invention to provide a process of coating an electric component with a resin by dipping the component into the liquid resin-hardener compound, and of curing the thus deposited coating by way of heating, from which there will then result an envelope which is free of blisters and pores.

This object is achieved by a process of coating an electric component with a setting artificial resin by dipping the component in a heated condition into a liquid resin-hardener compound and curing the deposited layer by the application of heat.

Advantageous further embodiments of the invention include applying further heat from within the component.

DETAILED DESCRIPTION OF THE INVENTION

In the process according to the invention, the component is dipped in its heated state into the liquid resin-hardener compound. In so doing, and unlike in the conventional dipping processes, there is first cured the layer directly surrounding the component, so that tightly on the component there is produced an artificial resin layer which is cured and has a sealing effect. As the heat dissipated by the component, further progresses into the liquid resin-hardener compound, further layers are cured, so that in the most favorable case it is possible to produce in the course of one single dipping process a sufficiently thick layer of artificial resin around the component. Considering that the liquid resin-hardener compound does not contain any air, also no air bubbles or pores are produced in the layer. Since, on the other hand, the component, prior to being dipped into the liquid resin-hardener compound, is subjected to heat, the majority of the air contained in the component is driven out of the component, or the gases produced during the heating of the component can escape without further ado. Moreover, the hardened artificial resin layer as formed directly on the surface of the component prevents a penetration of air or gases out of the component.

Accordingly, in this case there is obtained a coating layer of hardened artificial resin which is completely free from pores and bubbles (blisters). The process is of particular advantage when used for electric components with which there is an increased danger of them emitting air or gases into the deposited layer. This is the case, for example, with tantalum capacitors containing a porous sintered body of tantalum. In the sintered body and in the layers deposited onto the sintered body, for example, a manganese dioxide layer and contact layers arranged thereon, there is stored air which is forced to escape during the heating, so that the process according to the invention may be applied with particular advantage to such capacitors.

The amount of heat transferred to the artificial resin, of course, depends on the temperature of the component, to which the latter has been heated prior to the dipping, and of the heat capacity of the component itself. In the case of components which, prior to the dipping, may not be exposed to any excessively high temperature or which have a relatively small heat capacity, it may happen that the stored heat is insufficient for effecting a complete curing of a sufficiently thick enveloping layer. In such cases therefore, it is of advantage to further supply heat to the component when in the dipped state. Advantageously, the dipped component is supplied with heat via the electric terminals. In this process just the electric terminals and those parts of the terminals which are connected to the electrodes of the component, are heated particularly well. This causes a particularly thick protective layer of artificial resin to be formed at those locations. Only the connecting points between the electric terminals and the electrodes of the component are particularly endangered by the effects of the surrounding atmosphere.

The heating of the component in its dipped state, however, may also be carried out in another way. Thus, the metallic parts of the component may be heated inductively, with the non-conducting artifical resin not taking up any energy, so that also in this case the heating, by starting from the component itself, progresses towards the outside into the artificial resin compound. The particular method to be utilized depends on the particular qualities of the component to be heated. Appropriate choices of power and duration will be evident to those in the art.

For effecting the complete curing of the deposited coating there may also be carried out, subsequently thereto, a treatment with heated air or else by the action of heat radiation. The component itself is protected by the internal layer, so that in the course of this re-curing it is possible to use a substantially higher temperature than would be possible for curing cold-dipped components, or in the whirl-sintering process. It has proved, for example, that a heating in the case of tantalum capacitors with a porous sintered body of tantalum up to 150° to 160° C. is possible without this having any disadvantageous effects upon the capacitor while with the conventional processes a heating is only possible up to a maximum of 120° to 130° C. By the greater heat there is achieved a much quicker curing of the external artificial resin coating, so that altogether the curing takes place much quicker than in conventional processes.

Achieving a sufficiently thick coating by a single dipping is sponsored in particular by the fact that there is used a resin having a corresponding viscosity. For adjusting the viscosity, it is possible to add fillers in suitable amounts to the resin-hardener compound.

The process according to the invention had proved to be of particular advantage for manufacturing artificial resin coated tantalum capacitors having a porous sintered body of tantalum.

We claim:

1. A process for coating a capacitor having a porous tantalum sintered body and electric terminals with a setting artificial resin, said process comprising the steps of heating said capacitor and dipping said heated capacitor and a portion of said terminals into a liquid resin-hardener compound, supplying heat to said electric terminals while said capacitor is dipped in said liquid resin-hardener compound.

2. A process as claimed in any one of claim 1, further comprising a final curing of the deposited artificial resin.

3. A process as claimed in claim 2 further comprising treatment with heated air during said final curing.

4. A process as claimed in claim 2 further comprising carrying out said final curing by heat radiation.

5. A process as claimed in claim 2 comprising heating the artificial resin to temperatures ranging from 150° to 160° C. during said final curing.

6. A process as claimed in claim 1 further comprising the addition of fillers to said liquid resin-hardener compound.

* * * * *